United States Patent [19]

Wilson et al.

[11] 4,112,025

[45] Sep. 5, 1978

[54] METHOD OF AND APPARATUS FOR JET AERATION

[75] Inventors: George E. Wilson, Sterling; Milo E. Friesen, Rock Falls, both of Ill.

[73] Assignee: Houdaille Industries, Inc., Buffalo, N.Y.

[21] Appl. No.: 382,650

[22] Filed: Jul. 26, 1973

Related U.S. Application Data

[63] Continuation of Ser. No. 302,355, Oct. 30, 1972, abandoned, which is a continuation of Ser. No. 29,565, Apr. 17, 1970, abandoned.

[51] Int. Cl.² .............................................. B01F 3/04
[52] U.S. Cl. ........................................ 261/29; 261/76; 261/124; 261/DIG. 47; 261/DIG. 75; 239/434
[58] Field of Search ........ 261/76, 77, 78 A, DIG. 47, 261/124, 29, DIG. 75; 210/7; 239/434

[56] References Cited

U.S. PATENT DOCUMENTS

| | | | |
|---|---|---|---|
| 1,366,431 | 1/1921 | Strohmaier et al. | 261/77 |
| 1,598,858 | 9/1926 | Greenawalt | 261/124 |
| 1,945,328 | 1/1934 | Perkins | 239/434 |
| 2,012,315 | 8/1935 | McIntire | 261/77 |
| 2,366,354 | 1/1945 | Robbins | 239/434 |
| 2,479,403 | 8/1949 | Powers | 210/7 |
| 2,582,198 | 1/1952 | Etheridge | 261/77 |
| 2,650,810 | 9/1953 | Nordell | 261/DIG. 47 |
| 2,883,169 | 4/1959 | Daman | 261/77 |
| 3,446,353 | 5/1969 | Davis | 261/77 |
| 3,640,516 | 2/1972 | Willinger | 261/DIG. 75 |

*Primary Examiner*—Tim R. Miles
*Attorney, Agent, or Firm*—Fitch, Even, Tabin & Luedeka

[57] ABSTRACT

A method of and apparatus for transferring gas to liquid, for example, air to liquid in an aeration process. Included is a novel combination air-liquid conduit and a method of making same, a novel jet aerator wherein the outlet section is shortened to include only a converging portion, a novel aeration system utilizing the conduit and jet aerator aforesaid and a novel coupling means for mounting the aerator on the conduit.

4 Claims, 11 Drawing Figures

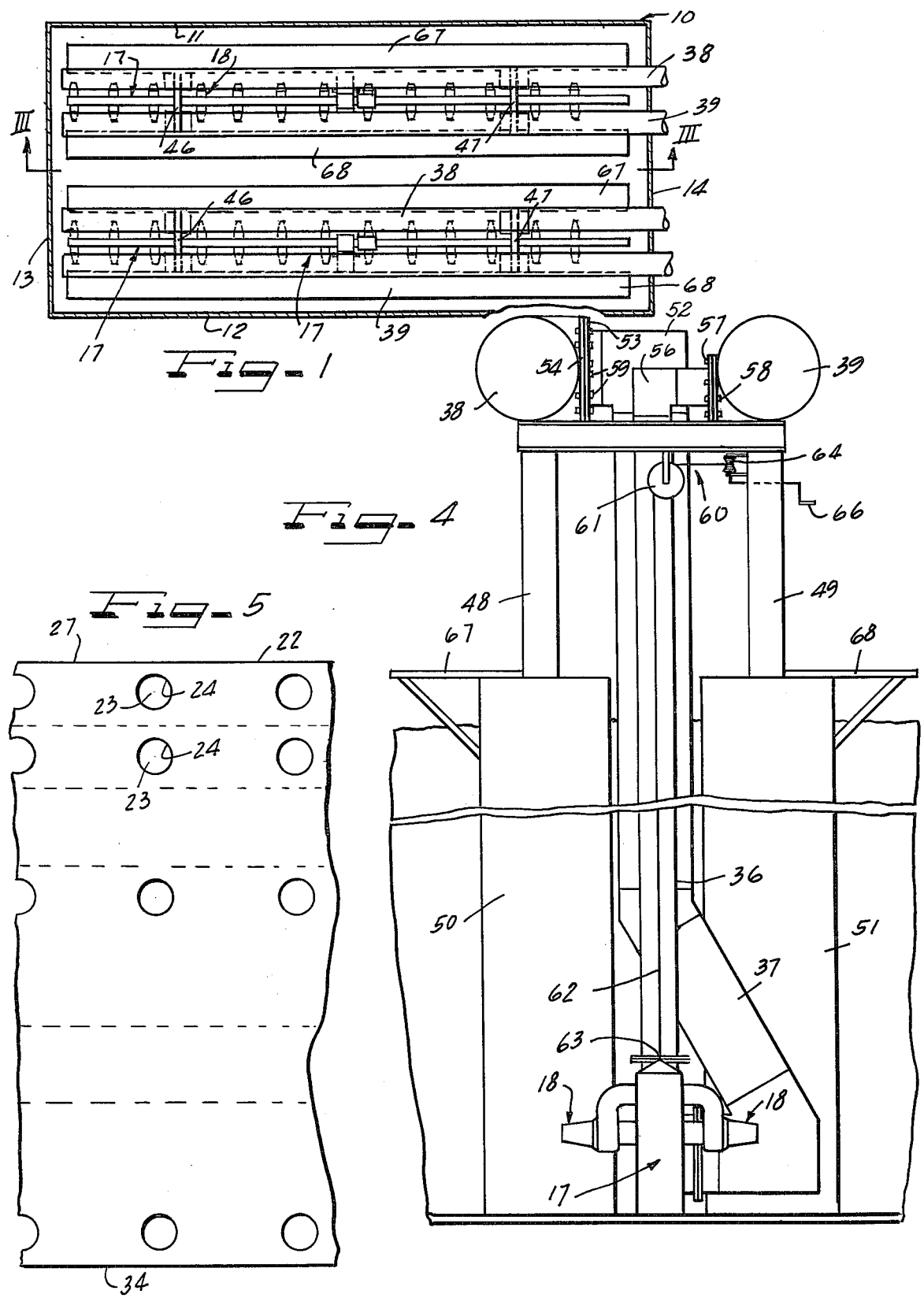

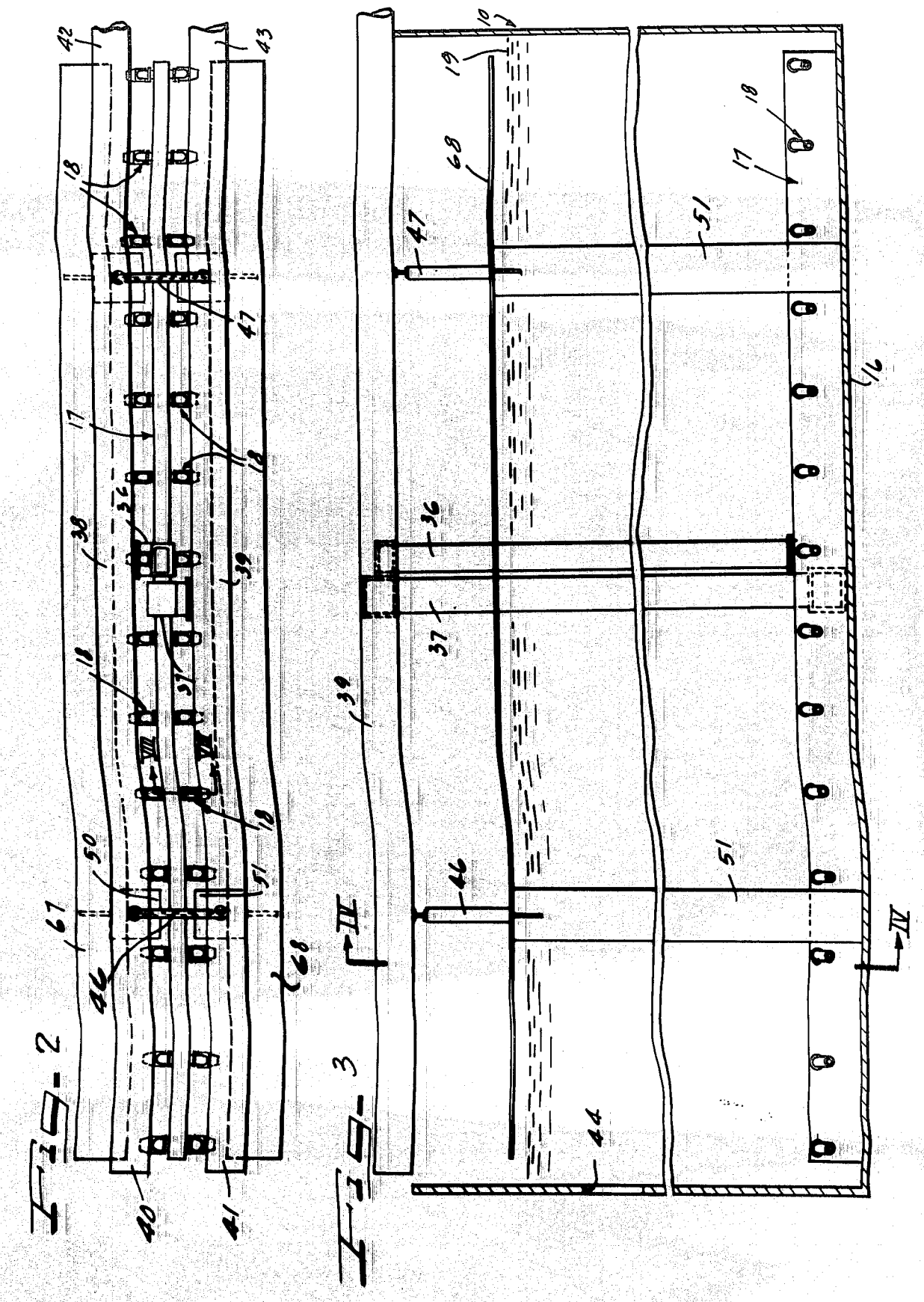

METHOD OF AND APPARATUS FOR JET AERATION

This is a continuation of application Ser. No. 302,355, filed Oct. 30, 1972, now abandoned, which is in turn a continuation of application Ser. No. 29,565, filed Apr. 17, 1970, now abandoned.

BACKGROUND OF THE INVENTION

This invention relates generally to the field of gas-liquid transfer and more particularly to a method of and means for adding gas such as air to a tank or other body of subsaturated liquid.

While the invention may be advantageously utilized in a variety of gas-liquid transfer applications including, for example, the addition of chlorine into water in water treatment plants and the addition of chlorine into pulp stock in the papermaking art, the invention finds particular utility in the field of reaeration of oxygen deficient or undersaturated liquid.

For example, in the activated sludge process of sewage treatment the incoming sewage, after passing through a presettling tank from which raw sludge is removed, is directed into an aeration tank for the purpose of adding oxygen to the liquid. This process, generally known as aeration, is generally accomplished in the aeration tank by means of compressed air which is diffused into the liquid by various devices, including filter plates, filter tubes and ejectors, or by means of mechanical agitators.

While the term "aeration" is commonly used in connection with processes for treating waste material, it is used herein, in addition to the foregoing, in connection with any process or system by which gas is transferred into subsaturated liquid. Jet aeration is defined herein as an aeration system which utilizes apparatus for directing a stream or jet of gas-liquid mixture into a tank or other body of the liquid to increase the gas content thereof.

While known systems of jet aeration are advantageously employed in a variety of applications, the present invention represents improvements in jet aeration and in aerators used in jet aeration systems which reduce operating costs, increase efficiencies, minimize maintenance down time and reduce fabrication and installation costs.

SUMMARY OF THE INVENTION

The invention may be briefly summarized as including within its purview an improved system of jet aeration comprising a jet aerator having a shortened outlet section which includes only a converging portion. Another aspect of the invention comprises an improved combination air-liquid conduit constructed of an elongated sheet-form member shaped along the length thereof so as to provide in transverse cross-section an air passage and a liquid passage separated by a common divider wall. The invention also includes improved means for mounting a jet aerator on the conduit comprising a resilient deformable washer mounted on a tubular coupling of the aerator and means for axially contracting and radially expanding the washer into snug sealing engagement with the wall of an aperture formed in the conduit into which the tubular coupling is inserted. In addition, the invention comprises an aeration system including a plurality of liquid submerged jet aerators and means for easily and quickly removing the jet aerators from the liquid for purposes of maintenance and replacement.

Included among the objects of the invention are to simplify construction of the air-liquid conduit, to improve the performance characteristics of the aerator and reduce the fabrication costs thereof and to provide a jet aeration system which, as compared with prior art systems, is more economical in construction and installation, results in reduced operating costs due to greater efficiency and is generally susceptible to assimilation into existing aeration systems.

Many other features, advantages and additional objects of the present invention will become manifest to those versed in the art upon making reference to the detailed description which follows and the accompanying sheets of drawings, in which preferred structural embodiments incorporate the principles of the present invention as shown by way of illustrative example only.

BRIEF DESCRIPTION OF THE DRAWING

FIG. 1 is a top plan view of an aeration tank and associated apparatus mounted therein constructed in accordance with the principles of the present invention.

FIG. 2 is an enlarged plan view of one unit of the aeration apparatus shown in FIG. 1.

FIG. 3 is a sectional view taken along lines III—III of FIG. 1 with a large header liquid duct removed for illustration purposes.

FIG. 4 is an enlarged vertical sectional view taken substantially along lines IV—IV of FIG. 3, with a portion of a support column broken away to show a duct connection.

FIG. 5 is an enlarged fragmental plan view of a sheet form member from which the combination air-liquid conduit of the present invention is formed.

FIG. 6 is a top plan view of a jet aerator constructed in accordance with the principles of the present invention.

FIG. 7 is a front elevational view of the aerator shown in FIG. 6.

FIG. 8 is an enlarged cross-sectional view taken along lines VIII—VIII of FIG. 2 which shows a jet aerator of the present invention mounted in place on the combination air-liquid conduit.

DESCRIPTION OF THE PREFERRED EMBODIMENTS

Figure 9:
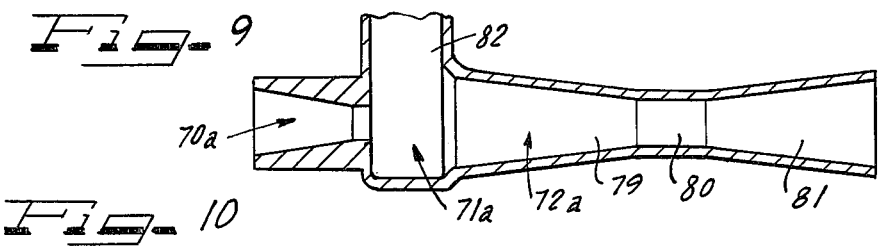
FIG. 9 illustrates a conventional ejector, the outlet section of which comprises a converging portion followed by a portion of uniform cross-section followed by a diverging portion.

There are a variety of gas-liquid transfer applications, such as drinking water and paper pulp chlorination as mentioned hereinabove, and one of the most important applications at the present time involves the aeration of liquid in industrial waste and municipal sewage in the elimination of water pollution.

Industrial wastes and municipal sewage have a serious adverse effect on the oxygen content of a body of water or stream into which they flow. Organic industrial wastes as well as some chemical wastes have high oxygen demands and of course, municipal sewage requires oxygen for its stabilization by bacteria. The quantity of oxygen required by the bacteria to oxidize the duits 17. Referring to FIGS. 6-8, each of the aerators 18 comprises a body 69 having a nozzle section 70, a mixing chamber 71 and an outlet section 72. The body 69 further comprises a pair of spaced parallel tubularly shaped cylindrical externally threaded couplings 73 and 74 which communicate respectively with the nozzle section 70 and the mixing chamber 71.

Mounted on each of the couplings 73 and 74 is a resilient washer 76 which is sandwiched between first and second internally threaded annular rings 77 and 78. The outside diameter of the ring 77 is slightly smaller than the diameter of the apertures 24 formed in the conduit 17 and the outside diameter of the resilient washer 76 is also slightly smaller than the diameter of the apertures 24 when the washers are in a free or unstressed state.

In mounting a jet aerator 18 on the conduit 17, the couplings 73 and 74 are inserted into a pair of apertures 23 opening respectively to the air and liquid passages 20 and 21 to an extent such that the resilient washers 76 are adjacent the aperture walls 24. The annular rings 78 of the couplings 73 and 74, the outside diameters of which are greater than the diameters of the aperture walls 24, are threaded in the direction of the rings 77, which latter rings serve as radial abutments for the adjacent ends of the washers 76. As the rings 78 are threaded against the resilient washers 76 the washers are placed in a state of axial compression and are expanded radially into snug abutting and sealing relation, not only with the aperture walls 24 but also with the adjacent outer surfaces of the couplings 73 and 74 to provide fluid and air-tight seals around the couplings.

As a consequence all weld and other connection methods are avoided and the aerators can be quickly and economically installed on the conduits, the only required tooling being a wrench or the like to rotate the rings 78.

The jet aerators 18 also represent improvements in aerators heretofore utilized in submerged gas-liquid transfer applications. Referring to FIG. 9 there is disclosed a conventional aerator, the outlet section 72a of which comprises a converging portion 79 immediately downstream of a mixing chamber 71a, followed by a portion 80 of uniform cross-section along the length thereof followed by a diverging portion 81. In operation the liquid which enters the nozzle section 70a under pressure, increases in velocity in the nozzle section and then expands in the mixing chamber 71a to entrain gas conducted to the mixing chamber 71a by means of a connection 84. The mixture of liquid and entrained gas then passes through the converging portion 79, in which the velocity of the mixture is increased; then through the portion 80 of uniform cross-section; then through the diverging portion 81 in which the pressure of the mixture is again increased and then discharges from the outlet thereof.

Referring to FIG. 8, it is noted that the jet aerator 18 constructed in accordance with the principles of the present invention utilizes a shortened outlet section which comprises only the converging portion 72, at the end of which is a radial abutment wall 82 forming an outlet 83 opening directly into the subsaturated liquid in the tank 10. Thus, the portion of uniform cross section and diverging portion included in conventional jet aerators are eliminaed from the jet aerator 18 of the present invention.

Applicants have ascertained that, in gas-transfer applications wherein aerators are employed in submerged relation to the liquid to which the gas is to be transferred, upon shortening of the outlet section by eliminating the portion of uniform cross-section and the diverging portion, the performance efficiency of the transfer of gas into the liquid is increased. By performance efficiency is meant the pounds of standard oxygen transferred to tap water per horsepower-hour of energy expended.

Figure 10:
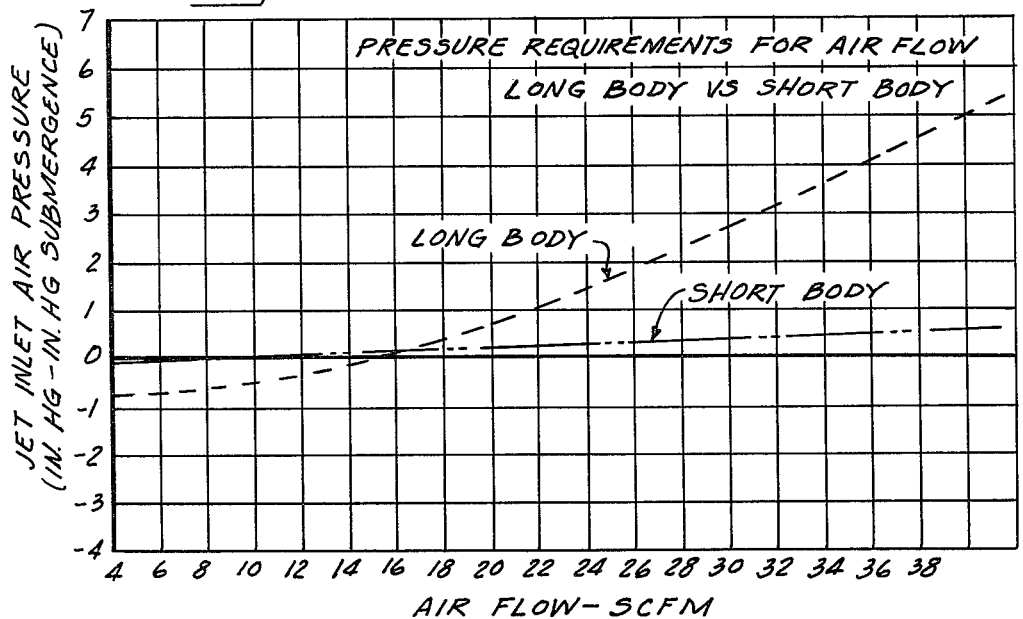
FIGS. 10 and 11 are diagrams indicating certain performance characteristics of a conventional ejector vis-a-vis an ejector constructed in accordance with the principles of the present invention.
Figure 11:
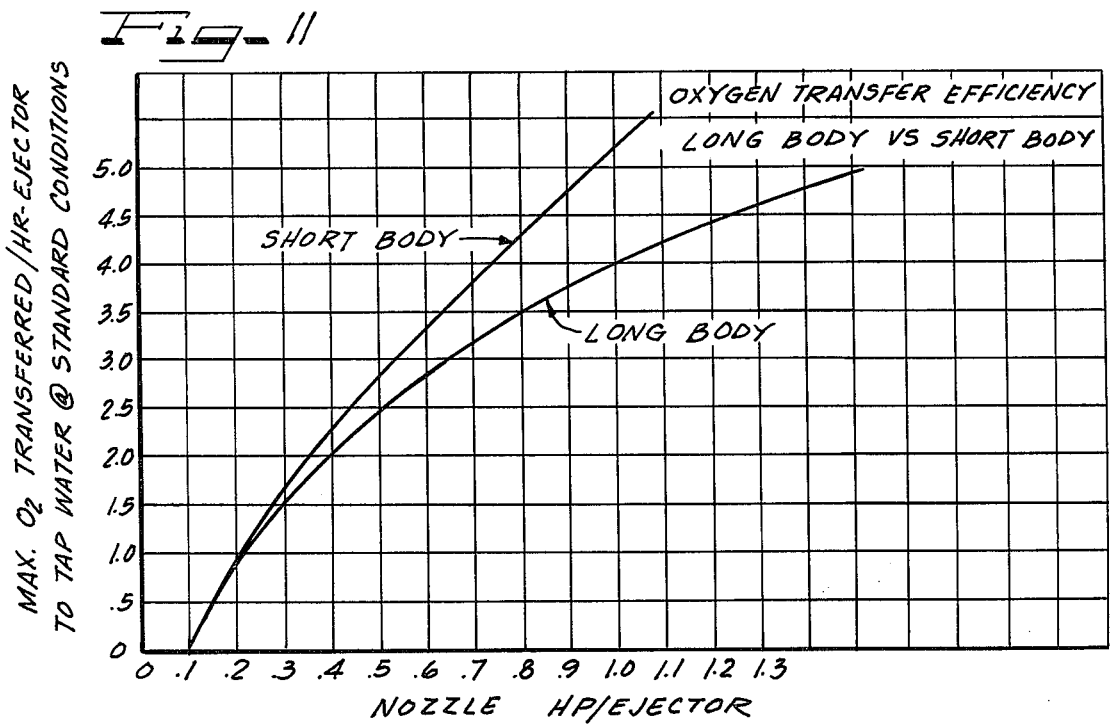

The graphs shown in FIGS. 10 and 11 illustrate performance characteristics of two jet aerators similar in all respects except for the outlet section. The curves therein are based on tests conducted by or under the direction of applicants and the curves indicated by the designation "long body" indicate performance characteristics of an aerator having a conventional outlet section which includes a converging portion as well as a diverging portion, whereas the curves indicated by the designation "short body" indicate the peformance characteristics of an identical aerator having a shortened outlet section, that is, a diffuser section having only a converging portion.

The curves illustrated in FIG. 10 indicate that substantially less pressure is required in the operation of a "short body" liquid-air jet aerator vis-a-vis a "long body", to produce a given flow of air above a given air flow rate. FIG. 11 indicates that substantially less horse power is required using a "short body" aerator in transferring oxygen to water at standard conditions at any given transfer rate.

In all of the tests conducted in compiling the data shown in FIGS. 10 and 11 the liquid used was tap water at standard conditions and the gas was air. Applicants are of the opinion that the increased performance characteristics of the shortened or "short body" aerators are due to an increased entrainment of subsaturated liquid in the gas-liquid plume issuing from the outlet 83 per unit of energy expended. Based upon these test results it would not be unreasonable to assume that the majority of the transfer of the gas into the liquid occurs, not within the body of the aerator as was heretofore assumed, but instead within the bulk of liquid into which the aerator jets the gas-liquid mixture. The shortened aerator 18 of the present invention apparently transfers substantially more gas into the bulk liquid in the discharge plume per unit of energy expended than does a conventional aerator which includes a converging portion in the outlet section.

The principles of gas-liquid transfer involved in the present invention are deemed to have general applicability in any application involving the utilization of injector type devices submerged within a body of liquid for the purpose of transferring gas to the liquid. As a consequence of improved performance characteristics substantial savings in operating costs may be enjoyed in the aeration process of activated sludge plants, as well as in similar gas-liquid transfer applications, through the utilization of the jet aerator 18.

Although minor modifications might be suggested by those versed in the art, it should be understood that we wish to embody within the scope of the patent warranted hereon all such modifications as reasonably come within the scope of our contribution to the art.

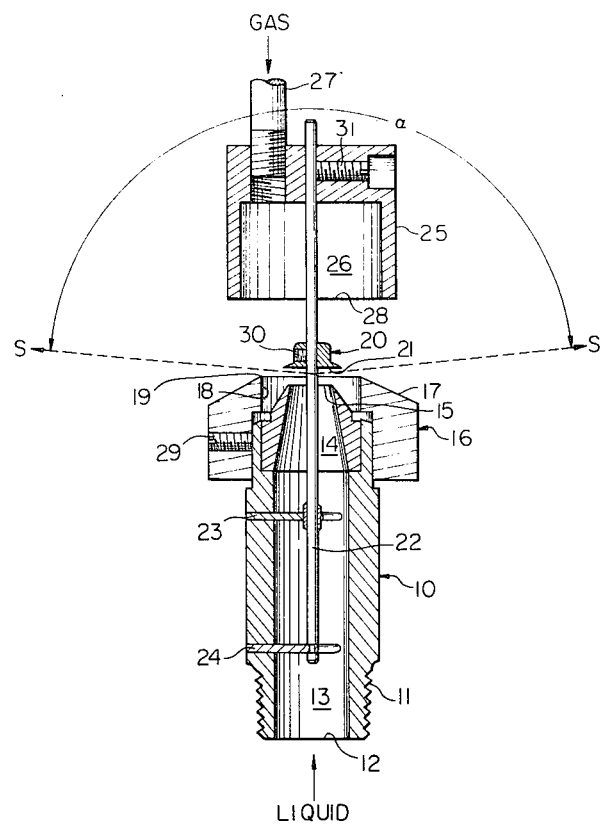

What we claim is:

1. The method of treating a body of liquid by increasing the oxygen content thereof comprising the steps of producing a pressurized liquid stream,
directing said liquid stream into a first enclosed axial flow path the cross sectional area of a portion of which decreases in the direction of the flow of the liquid stream to increase the velocity thereof, discharging the high velocity liquid stream from said first axial flow path through an outlet formed at the downstream end thereof and substantially horizontally into an enclosed mixing chamber, introducing a stream of pressurized air into said mixing chamber, entraining air from said air stream in said liquid stream in said mixing chamber, directing the liquid and entrained air from said mixing chamber into a second enclosed frusto conical axial flow path of constantly decreasing cross section disposed in axial alignment with said first axial flow path, and discharging the liquid and entrained air from said second axial flow path substantially horizontally through an outlet formed at the downstream end thereof, the outlet of said second axial flow path being located within the body of liquid below the surface thereof and being in axial alignment with and having an open area greater than the outlet of said first axial flow path.

2. The method as defined in claim 1 wherein the outlets of said first and second axial flow paths are circular.

3. The method as defined in claim 1 wherein the pressurized air is introduced into the mixing chamber at an angle to the axes of said first and second axial flow paths.

4. An aeration system for aerating a body of liquid comprising means for confining a body of liquid, means defining an enclosed mixing chamber, means for introducing a stream of pressurized air into said mixing chamber, a source of pressurized liquid, a first conduit extending from said source to said mixing chamber and forming a first enclosed substantially horizontal axial flow path the cross sectional area of a portion of which decreases in the direction of the flow of liquid to increase the velocity thereof and discharge the high velocity liquid stream from said first axial flow path through an outlet formed at the downstream end thereof as the liquid passes into the mixing chamber to entrain air from said air stream in said liquid in said mixing chamber, a second conduit extending from said mixing chamber to said body of liquid and forming a second enclosed frusto conical axial flow path of constantly decreasing cross section disposed in alignment with said first axial flow path for discharging the liquid and entrained air through an outlet formed at the downstream end thereof, the outlet of said second conduit being located within the body of liquid below the surface thereof and being in axial alignment with and having an open area greater than the outlet of said first conduit.

* * * * *

United States Patent [19]

Kumazawa

[11] 4,112,026

[45] Sep. 5, 1978

[54] BUBBLE GENERATING APPARATUS

[75] Inventor: Toshiharu Kumazawa, Fujisawa, Japan

[73] Assignee: Mitsubishi Precision Co., Ltd., Japan

[21] Appl. No.: 727,275

[22] Filed: Sep. 27, 1976

[30] Foreign Application Priority Data

Nov. 4, 1975 [JP] Japan ............................... 50-131405
May 27, 1976 [JP] Japan ............................... 51-060559

[51] Int. Cl.² .............................................. C02D 1/04
[52] U.S. Cl. ..................... 261/29; 261/117;
261/123; 261/DIG. 75; 239/420; 239/515
[58] Field of Search ............... 239/101, 102, 418, 420,
239/421, 515, 545; 261/28, 29, 36 R, 123, 117,
118, DIG. 75

[56] References Cited

U.S. PATENT DOCUMENTS 3,278,170  10/1966  Moritz ..................................... 261/29
3,951,344  4/1976   Wilson .................................... 239/421

FOREIGN PATENT DOCUMENTS 231,656  1/1910  Fed. Rep. of Germany ........... 239/421

Primary Examiner—Robert W. Saifer
Attorney, Agent, or Firm—Merchant, Gould, Smith, Edell, Welter & Schmidt

[57] ABSTRACT

An apparatus for generating bubbles in a liquid is disclosed which has a liquid spouting nozzle element for violently spouting a pressurized liquid, an impact disperser for generating a dispersion stream of the pressurized liquid directed into the liquid surrounding the impact disperser when the spouted pressurized liquid impinges upon the disperser and a gas supplier for supplying and guiding a stream of gas to a region surrounding the impact disperser thereby causing the gas stream to be dragged into the dispersion liquid stream. The gas dragged into the dispersion liquid stream is dispersed in the liquid and converted into fine bubbles.

9 Claims, 9 Drawing Figures